United States Patent [19]
Nakano

[11] Patent Number: 5,345,352
[45] Date of Patent: Sep. 6, 1994

[54] REDUCED-HEIGHT DISC DRIVE THAT POSITIONS CIRCUITRY BETWEEN THE INTERIOR SURFACE OF THE DRIVE AND THE SURFACE OF THE DISC

[75] Inventor: Katsuhiro Nakano, Kanagawa, Japan

[73] Assignee: Sony Corporation, Tokyo, Japan

[21] Appl. No.: 111,283

[22] Filed: Aug. 24, 1993

Related U.S. Application Data

[63] Continuation of Ser. No. 837,062, Feb. 18, 1992, abandoned.

[30] Foreign Application Priority Data

Feb. 22, 1991 [JP] Japan .................................. 3-050519

[51] Int. Cl.$^5$ ............................................. G11B 5/012
[52] U.S. Cl. .................................................. 360/97.01
[58] Field of Search ........................... 360/97.02–97.04, 360/97.01

[56] References Cited

U.S. PATENT DOCUMENTS 4,712,146 12/1987 Moon ............................... 360/97.03
5,025,336 6/1991 Morehouse ....................... 360/97.02

Primary Examiner—A. J. Heinz
Attorney, Agent, or Firm—Philip M. Shaw

[57] ABSTRACT

A reduced height disc drive apparatus having a record medium and drive motor disposed within a tightly closed box and a thin, non-fibrous type circuit board mounted in an extra space formed between the record medium and an internal surface of the box.

14 Claims, 4 Drawing Sheets

REDUCED-HEIGHT DISC DRIVE THAT POSITIONS CIRCUITRY BETWEEN THE INTERIOR SURFACE OF THE DRIVE AND THE SURFACE OF THE DISC

This is a continuation of co-pending application Ser. No. 07/837,062 filed on Feb. 18, 1992, now abandoned.

BACKGROUND OF THE INVENTION

1. Field of the Invention

The present invention relates to a disc drive apparatus and, in particular, to a reduced-height disc drive apparatus

2. Description of the Related Art

In a conventional hard-disc device, as illustrated in FIG. 1, a hard disc 6 is rotatably held through a spindle motor 4 and a disc fixing hub 5 in a tightly closed box 10 consisting of a housing 3 and a chassis 7.

Proposed on the chassis 7 is a rotary arm 9 rotated about a rotary shaft 8 by means of a linear actuator 16 constructed of a voice coil motor. A rotary position of this rotary arm 9 is detected by, e.g., an opto-positional detector (unillustrated). Recording/reproducing heads 11, 12 attached to the top end of the rotary arm 9 are caused to make a predetermined amount of movement on the surface of the hard disc 6, thereby performing movement-positioning of the recording/reproducing heads 11, 12 with respect to the respective tracks formed in an information recording track region on the hard disc 6.

A linear actuator 16 is constructed such that a yoke member 13 and a tabular magnet 14 are fixed onto the chassis 71, a coil unit 15 fixed to a part of the rotary arm 9 is disposed opposite to the magnet 14; and the rotary arm 6 is rotated by passing a driving current through the coils of the coil unit 15.

The hard disc 6 is placed on the upper surface of a rotary member 4A of the spindle motor 4 and is thereafter fixed to this rotary member 4A of the spindle motor 4 by fixing a disc fixing hub 5 by a method such as screw fastening, etc.

Components consisting of the hard disc, etc. are thus disposed on the chassis 7 and are tightly closed from outside by the housing 3.

A circuit board 17 composed of a glass epoxy material is fixed to a lower surface of the chassis 7. A circuit (not shown) driving the hard-disc device 1 is formed on the surface of the circuit board 17.

This type of hard-disc device 1 is desirably, for the purpose of its being mounted on, e.g., a portable small-sized computer, miniaturized to the greatest possible degree. The thickness dimension thereof, however, to be further decreased.

Hence, in the hard-disc device 1, when the box 10 incorporates the circuit board 17 fixed to the lower surface of the chassis 7, the hard-disc device 1 can be, it is considered, decreased in thickness correspondingly.

Generally, the glass epoxy material for forming the circuit board 17 tends to be contaminated with fine dust. If this glass epoxy material is provided in the box 10, a problem happens i.e., a so-called head crash takes place, wherein foreign matter such as dust enter between the recording/reproducing heads 11, 12 and the hard disc 6.

SUMMARY OF THE INVENTION

In view of the foregoing, an object of this invention is to provide a hard-disc device further reducible in thickness by obviating such problems at one time.

The foregoing object and other objects of the invention have been achieved by the present invention of a reduced height disc drive comprising a tightly closed box, a disc record medium disposed entirely within the box, a motor and disc hub assembly disposed entirely within the box for rotating the disc record medium, wherein the dimensions of the motor and disc hub assembly and the disc record medium are chosen relative to the interior dimensions of the box such that one or more interior spaces are created between an interior surface of the box and the motor and disc hub assembly and between the disc record medium and the interior surface of the box, and a circuit board and circuit contained within the box for controlling the operation of the disc drive are mounted to a portion of the interior surface of the box and project into the one or more interior spaces.

DETAILED DESCRIPTION OF THE INVENTION

Figure 1:
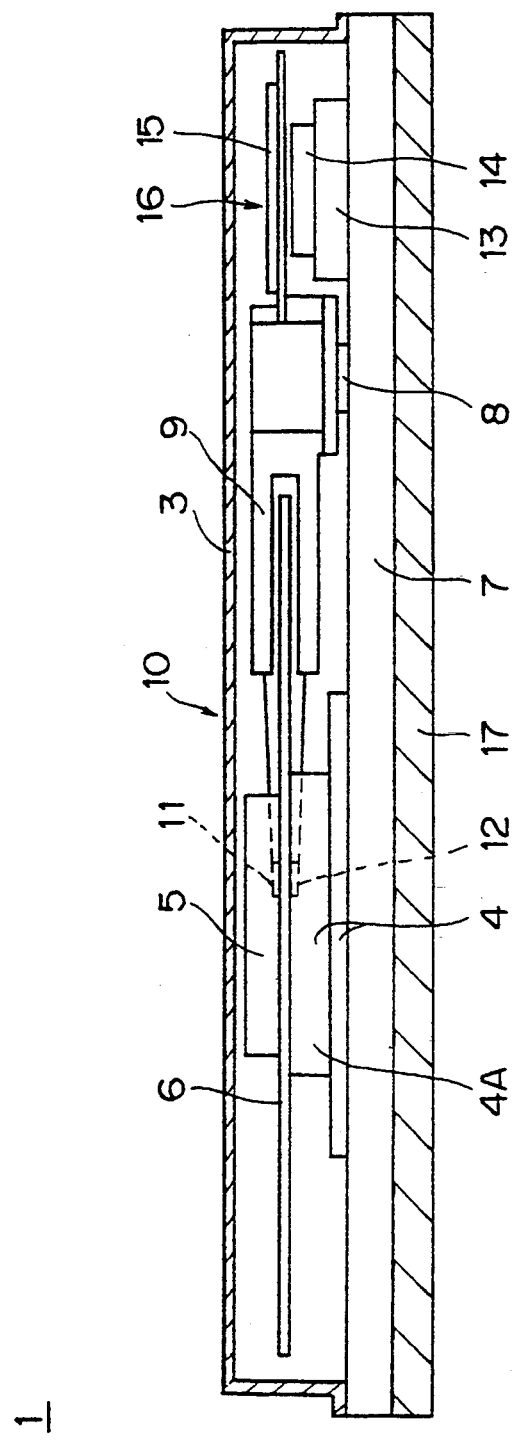
FIG. 1 is a side view showing a conventional example.
Figure 2:
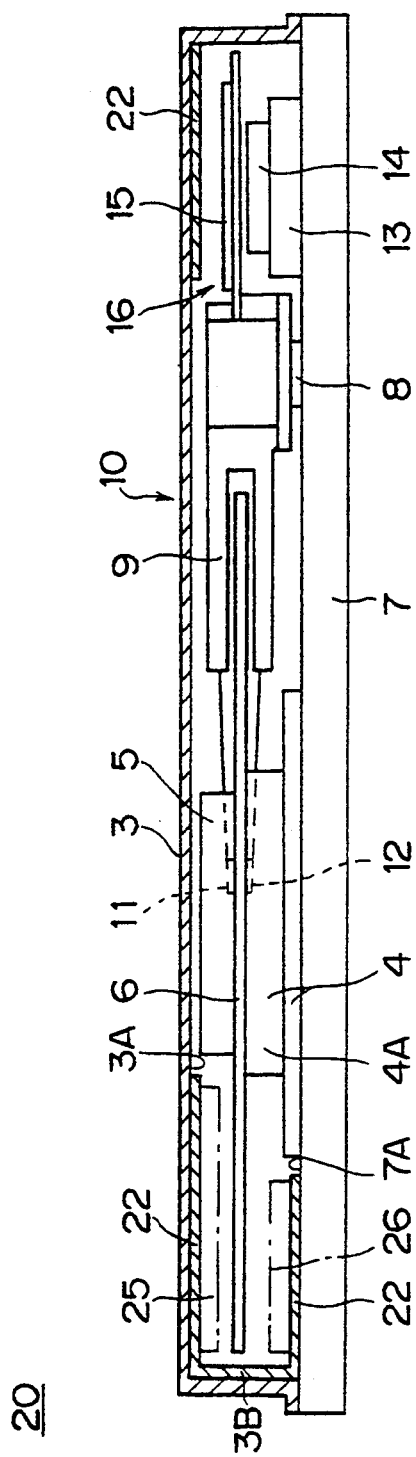
FIG. 2 is a side view showing one embodiment of a hard-disc device of this invention.

Preferred embodiments of this invention will be described with reference to the accompanying drawings:

Referring to FIG. 2 in which the portions corresponding to those of FIG. 1 are marked with the like reference numerals, a hard-disc device 20 has a thin type circuit board 22 exhibiting a flexibility and fixed within a box 10.

Figure 3:
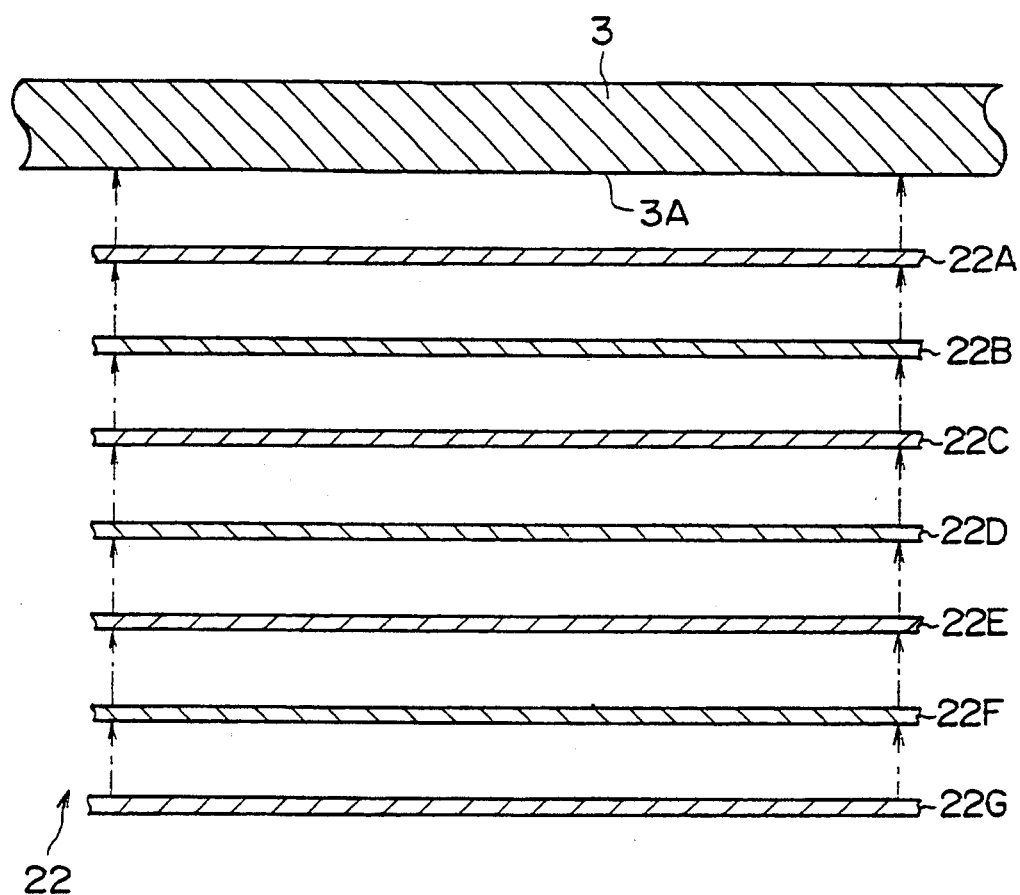
FIG. 3 is a schematic diagram illustrating a construction of a circuit board of this invention.

This circuit board 22 is constructed such that ground line layers 22B, a power supply line layer 22D and a signal line layer 22F each composed of a conductive foil are, as illustrated in FIG. 3, sealed with multi-layered thin film insulating layers 22A, 22C, 22E and 22G each formed of a polyimide resin exhibiting a flexibility by using bonding materials. These layers are pasted to an upper internal surface 3A and a right (as viewed in FIG. 2) internal surface 3B of the housing 3 and further to an upper surface 7A (FIG. 2) of a chassis 7.

The height dimension of the upper internal surface 3A of the housing 3 is herein determined based on a fitting height of a disc fixing hub 5 having the largest height dimension among the components constituting the hard-disc device 20. For this reason, an air space corresponding to a thickness of the disc fixing hub 5 is formed between the surface of the hard disc 6 and the upper internal surface 3A thereof. Paying attention to this, a circuit board 22 is disposed in a portion facing to the hard disc 6, and a chip-like circuit element 25 is disposed on the circuit board 22 by a method of soldering the circuit element to the signal line layer 22F (FIG. 3).

Figure 4:
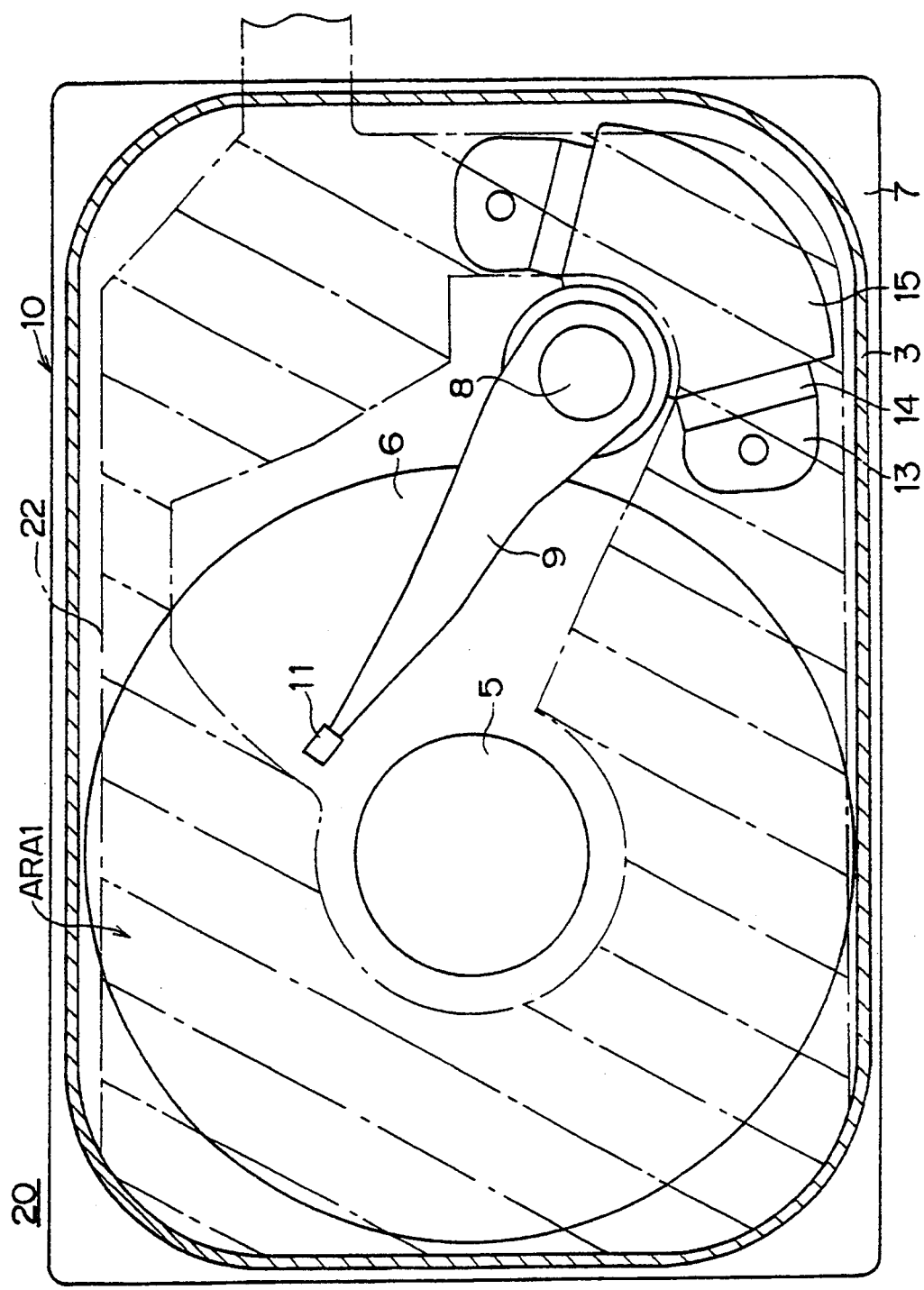
FIG. 4 is a plan view showing one embodiment of the hard-disc device of this invention.

More specifically, as depicted in FIG. 4, the disposition area of this circuit board on the side of the housing upper internal surface 3A is an area exclusive of rotary areas of the disc fixing hub 5 and of the rotary arm 9. The circuit board 22 does not interfere with rotary motions of the rotary arm 9 and of the disc fixing hub 5.

Especially, an area in which the circuit element 25 is disposed on the circuit board 22 is set as an area ARA1 confronting the hard disc 6 of the circuit board 22. The circuit element 25 is thereby attached by making use of the air space formed between the hard disc 6 and the upper internal surface 3A of the housing 3.

The circuit board 22 fixed to the housing upper internal surface 3A is partly fixed onto a housing right (as viewed in FIG. 2) internal surface 3B and further to an upper surface 7A of the chassis 7.

An air space corresponding to a dimension of thickness of a spindle motor 4 is formed in an area facing to the hard disc 6 on the circuit board 22 fixed to the upper surface 7A of the chassis 7. By utilizing the formation thereof, a predetermined circuit element 26 is connectively fixed to the signal line layer 22F (FIG. 3) by such a method as soldering, etc. on the circuit board 22 in this area.

When soldering the circuit elements 25, 26 to the circuit board, impurities are previously eliminated by washing and high-temperature processing. After fitting to the hard-disc device 20 has been thereby effected, an arrangement is performed so as not to cause a driving deterioration such as a head crash due to those impurities.

Fixed in this manner to the housing and the internal surface of the chassis 7 is the circuit board 22 in which the predetermined circuit elements 25, 26 are attached in the area ARA1 confronting the hard disc 6. The circuit for driving the hard-disc device 20 is thus formed, and a predetermined signal is inputted from outside to the driving circuit. It is therefore possible to drive-control the hard-disc device 20 in accordance therewith.

Based on the construction explained earlier, in the hard-disc device 20, the circuit board 22 is formed of a polyimide resin and hence the thickness of the circuit board 22 can be made still smaller than that of a conventional circuit board 17 composed of a glass epoxy resin. At the same time, it is feasible to avoid the generation of foreign matter such as resinous powder from the circuit board 22 itself. The circuit board 22 can be thereby disposed in an extra area within the box 10 constructed of the housing 3 and the chassis 7.

Hence, the hard-disc device 20 can be made even smaller in terms of thickness than the case where the circuit board 17 formed of the glass epoxy resin and having a large thickness dimension is, as in the prior art, provided outside of the box.

According to the construction described above, the circuit board 22 is disposed in the interior of the box 10, whereby the hard-disc device 20 can be further decreased in thickness. This becomes more effective in mounting the hard-disc device 20 on a portable small-sized computer and the like.

Note that the embodiment discussed above has dealt with the case of using the circuit board 22 composed of a polyimide resin and exhibiting the flexibility. The present invention is not, however, limited to this circuit board. In short, the requirement is that the circuit board is formed of a thin film resin which does not shed foreign matter such as resinous powder, etc.

Further, the embodiment discussed above has dealt with the case where the circuit board 22 is disposed in the area shown in FIG. 4. The present invention is not, however, limited to this area. In short, the circuit board may be provided in an extra space formed in the interior of the box of the hard-disc device 20.

Moreover, the embodiment discussed above has dealt with the case where the present invention is applied to the hard-disc device constructed to perform magnetic recording and reproducing. The present invention is not, however, limited to this hard-disc device but is applicable widely to an optomagnetic disc device constructed to execute optomagnetic recording and reproducing and other various disc devices.

As described above, according to this invention, the thin type circuit board is provided inwardly of the box. It is therefore feasible to attain a hard-disc device which can be further reduced in thickness.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A reduced height disc drive comprising:
   a tightly closed box;
   a disc record medium disposed entirely within the box;
   a motor and disc hub assembly disposed entirely within the box for rotating the disc record medium, wherein the dimensions of the motor and disc hub assembly and the disc record medium are chosen relative to the interior dimensions of the box such that a mounting space is created between an interior top surface of the box and the disc record medium;
   a circuit board contained within the box and mounted to an interior surface of the box so that the circuit board projects into the mounting space; and
   a circuit mounted on the circuit board for controlling an operation of the disc drive.

2. The hard-disc device according to claim 1, wherein the circuit board is comprised of a layer of a conductive foil and a thin film insulating layer formed of a polyimide resin which seals the layer of conductive foil.

3. The disc drive apparatus according to claim 1 wherein the circuit board is formed of a polyimide resin.

4. A reduced-height disc drive apparatus comprising:
   a disc having a top surface and a bottom surface;
   a disc fixing hub having a top surface, the disc fixing hub being connectable to the disc and extending a distance away from the top surface of the disc;
   a spindle motor having a bottom surface, the spindle motor being connectable to the disc fixing hub and extending a distance away from the bottom surface of the disc;
   a tightly-closed housing entirely encompassing the disc, the disc fixing hub, and the spindle motor and having an interior top surface formed adjacent to the top surface of the disc fixing hub, an interior bottom surface fastened to the bottom surface of the spindle motor, and a plurality of interior side surfaces; and
   a circuit board contained within the housing and having circuitry for controlling the apparatus, the circuit board being fastened to the interior top surface of the housing in an area formed between the top surface of the disc and the interior top surface of the housing, wherein the height of the disc drive apparatus is reduced by forming the interior top surface of the housing adjacent to the top surface of the disc fixing hub and by mounting the circuit board in the area formed between the top surface of the disc and the interior top surface of the housing.

5. The disc drive apparatus according to claim 4 wherein the circuit board is formed of a polyimide resin.

6. The disc drive apparatus according to claim 5 wherein the circuit board includes a plurality of conductive layers.

7. The disc drive apparatus according to claim 6 wherein the conductive layers each comprises a conductive foil sealed within a thin film insulating layer.

8. The disc drive apparatus according to claim 7 wherein the thin film insulating layer includes a polyamide resin.

9. The disc drive apparatus according to claim 4 wherein the circuit board is further connected to the interior bottom surface of the housing in the area formed between the bottom surface of the disc and the interior bottom surface of the housing.

10. The disc drive apparatus of claim 9 wherein the circuit board is further connected to one of the interior side surfaces of the housing.

11. A reduced-height disc drive apparatus comprising:

a disc having a top surface and a bottom surface;

a disc fixing hub having a top surface, the disc fixing hub being connectable to the disc and extending a distance away from the top surface of the disc;

a spindle motor having a bottom surface, the spindle motor being connectable to the disc fixing hub and extending a distance away from the bottom surface of the disc;

a rotary arm assembly having a top surface and a bottom surface;

a tightly-closed housing entirely encompassing the disc, the disc fixing hub, the spindle motor, and the rotary arm assembly, and having an interior top surface formed adjacent to the top surface of the disc fixing hub, an interior bottom surface fastened to the bottom surface of the spindle motor and the bottom surface of the rotary arm assembly, and a plurality of interior side surfaces; and a circuit board contained within the housing and having circuitry for controlling the apparatus, the circuit board being fastened to the interior top surface of the housing around the disc fixing hub and the rotary arm assembly so that the circuit board allows free movement of the disc fixing hub and the rotary arm assembly, wherein the height of the disc drive apparatus is reduced by forming the interior top surface of the housing adjacent to the top surface of the disc fixing hub and by mounting the circuit board to the interior top surface of the housing around the disc fixing hub and the rotary arm assembly.

12. The disc drive apparatus according to claim 11 wherein the circuit board is further fastened to the interior bottom surface of the housing in the area formed between the bottom surface of the disc and the interior bottom surface of the housing.

13. The disc drive apparatus of claim 12 wherein the circuit board is further connected to one of the interior side surfaces of the housing.

14. The disc drive apparatus according to claim 11 wherein the circuit board includes a plurality of layers of a conductive material and a plurality of layers of thin-film resin, wherein the plurality of layers of thin-film seal the plurality of layers of conductive material.

* * * * *